United States Patent [19]

Shipley et al.

[11] 4,409,126

[45] Oct. 11, 1983

[54] ULTRA HIGH EFFICIENCY CATALYST FOR POLYMERIZING OLEFINS

[75] Inventors: Randall S. Shipley, Alvin; Donald F. Birkelbach, Angleton, both of Tex.

[73] Assignee: The Dow Chemical Company, Midland, Mich.

[21] Appl. No.: 313,868

[22] Filed: Oct. 22, 1981

[51] Int. Cl.$^3$ .............................................. C08F 4/64
[52] U.S. Cl. ................................ 502/169; 526/125; 526/133; 526/134; 526/159; 502/170
[58] Field of Search ........... 252/429 A, 429 B, 429 C, 252/431 R

[56] References Cited

U.S. PATENT DOCUMENTS

| | | | |
|---|---|---|---|
| 3,257,332 | 6/1966 | Ziegler et al. | 252/429 |
| 3,458,493 | 7/1969 | Gaeth et al. | 260/94.3 |
| 3,489,731 | 1/1970 | Imoto et al. | 260/80.78 |
| 3,520,826 | 7/1970 | Tanaka et al. | 252/429 |
| 3,678,025 | 7/1972 | Birrell | 260/94.9 E |
| 3,687,910 | 8/1972 | Jones | 260/80.78 |
| 3,732,198 | 5/1973 | Whiteley et al. | 260/94.9 C |
| 3,738,944 | 6/1973 | Candlin et al. | 252/431 R |
| 3,917,575 | 11/1975 | Matsuura et al. | 252/429 B X |
| 3,943,067 | 3/1976 | Chan et al. | 252/429 C X |
| 3,989,878 | 11/1976 | Aishima et al. | 526/116 |
| 4,006,101 | 2/1977 | Matsuura et al. | 252/429 C |
| 4,067,822 | 1/1978 | Gessell et al. | 252/429 B |
| 4,091,082 | 5/1978 | Gessell et al. | 423/413 |
| 4,104,198 | 8/1978 | May, Jr. et al. | 252/429 B |
| 4,109,071 | 8/1978 | Berger et al. | 526/114 |
| 4,120,820 | 10/1978 | Birkelbach | 252/429 B |
| 4,144,390 | 3/1979 | Derroitte et al. | 252/429 C X |
| 4,148,755 | 4/1979 | Ligorati et al. | 252/429 C |
| 4,151,110 | 4/1979 | Cesca et al. | 252/429 C |
| 4,163,831 | 8/1979 | Gessell | 526/153 |
| 4,172,050 | 10/1979 | Gessell | 252/431 R |
| 4,212,961 | 7/1980 | Kobayashi et al. | 252/429 C X |
| 4,213,880 | 7/1980 | Knight et al. | 252/431 R |
| 4,224,186 | 9/1980 | Lowery et al. | 252/429 C |
| 4,269,733 | 5/1981 | Shipley | 252/431 R X |
| 4,276,191 | 6/1981 | Karayannis et al. | 252/429 C |
| 4,296,223 | 10/1981 | Berger | 252/429 C X |

FOREIGN PATENT DOCUMENTS

| | | |
|---|---|---|
| 49-14348 | 4/1974 | Japan . |
| 1492379 | 11/1977 | United Kingdom . |
| 1493159 | 11/1977 | United Kingdom . |
| 1500873 | 2/1978 | United Kingdom . |

OTHER PUBLICATIONS

Feld et al, *The Organic Chemistry of Titanium*, Pub. by Washington Butterworths, 1965, pp. 1-3, 11-14, 16-18, 129-135, 149-167.

Wailes et al, *Organometallic Chemistry of Titanium*, Pub. by Academic Press, 1974, pp. 7-29, 172-195.

L. Petrov, R. Kyrtcheve, Ph. Radenkov and D. Dobreva, Rev 1-3-78 Organometallics in Ethylene Polymerization with Catalyst System TiCl$_4$/Al(C$_2$H$_5$)$_2$Cl/mMg(C$_6$H$_5$)$_2$: 1. Suspension Polymerization Process; *Polymer*, vol. 19, May 1978, pp. 567-569.

*Primary Examiner*—Patrick Garvin
*Attorney, Agent, or Firm*—J. G. Carter

[57] ABSTRACT

Compositions consisting of the reaction product or complex resulting from the mixing of a transition metal compound such as a tetraalkoxy titanium compound and an organo compound of magnesium, aluminum, boron or lithium such as a dialkyl magnesium compound are useful in the preparation of catalysts for polymerizing α-olefins at ultra-high efficiencies at high polymerization temperatures.

10 Claims, No Drawings

ULTRA HIGH EFFICIENCY CATALYST FOR POLYMERIZING OLEFINS

BACKGROUND OF THE INVENTION

This invention relates to precursors for and to new catalyst compositions useful for initiating and promoting polymerization of α-olefins and to a polymerization process employing such catalyst compositions.

It is well known that olefins such as ethylene, propylene and 1-butene in the presence of metallic catalysts, particularly the reaction products of organometallic compounds and transition metal compounds, can be polymerized to form substantially unbranched polymers of relatively high molecular weight. Typically such polymerizations are carried out at relatively low temperatures and pressures.

Among the methods of producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups IVB, VB, VIB and VIII of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g. an aliphatic hydrocarbon, and the aforementioned catalyst. One or more olefins may be brought into contact with the reaction medium in any suitable manner. A molecular weight regulator, which is normally hydrogen, is usually present in the reaction vessel in order to suppress the formation of undesirable high molecular weight polymers.

Following polymerization, it is common to remove catalyst residues from the polymer but repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is believed to be caused by the general tendency of such catalysts to become rapidly depleted or deactivated by significantly higher temperatures that are normally employed in solution processes. In addition, processes involving the copolymerization of ethylene with higher α-olefins exhibit catalyst efficiencies significantly lower than ethylene homopolymerization processes.

Recently, catalysts having higher efficiencies have been disclosed, e.g., U.S. Pat. Nos. 3,392,159, 3,737,393, West German Patent Application No. 2,231,982 and British Pat. Nos. 1,305,610 and 1,358,437. While the increased efficiencies achieved by using these recent catalysts are significant, even higher efficiencies are desirable, particularly in copolymerization processes.

Even more recently, e.g. British Pat. No. 1,492,379, high efficiency catalysts have been employed which permit polymerization temperatures above 140° C. Such high polymerization temperatures provide for reduced energy requirements in solution polymerization processes in that the closer the polymerization temperature is to the boiling point of the polymerization solvent, the less energy that is required in removing the solvent.

Also, U.S. Pat. Nos. 4,250,286 and 4,269,733 disclose catalysts for use in polymerizing olefins at relatively high temperatures at high efficiencies.

Likewise, the present invention provides for catalysts having higher efficiencies at these temperatures or higher polymerization temperatures at comparable efficiencies.

SUMMARY OF THE INVENTION

The present invention in one aspect is a transition metal compound suitable for use in the preparation of olefin polymerization catalysts which is the reaction product or complex formed by mixing at a temperature and for a time sufficient to provide a color change (a) at least one transition metal (Tm) compound having at least one hydrocarbyloxy group attached to said transition metal and (b) at least one compound represented by the empirical formula $MR_xX_y$;

wherein M is a metal selected from magnesium, aluminum, boron, lithium or mixtures thereof; R is an alkyl group having from 1 to about 20, preferably from 1 to about 10 carbon atoms; X is a halogen, preferably chlorine or bromine; x has a value of from 1 to the valence of metal M; the value of $x+y$ is equal to the valence of M; the quantities of (a) and (b) employed being that which provides a ratio of Q:Tm of from about 0.1:1 to about 2:1, preferably from about 0.2:1 to about 1.5:1, most preferably from about 0.5:1 to about 1:1; and wherein Q has a value corresponding to the value of x divided by the valence of M times the number of moles of $MR_xX_y$.

Another aspect of the present invention are catalysts for polymerizing α-olefins which comprise the catalytic reaction product of (A) the aforementioned reaction product or complex;

(B) a magnesium halide resulting from the reaction of
  (a) an organomagnesium component and
  (b) a halide source; and (C) an organoaluminum compound, if required.

The components are employed in quantities which provide the composition with atomic ratios of the elements as follows:

Mg:Tm is from about 1:1 to about 200:1, preferably from about 2:1 to about 100:1, and most preferably from about 5:1 to about 75:1.

Al:Tm is from about 0.1:1 to about 200:1, preferably from about 0.5:1 to about 100:1, and most preferably from about 1:1 to about 75:1.

Excess X:Al is from about 0.0005:1 to about 5:1, preferably from about 0.002:1 to about 2:1, and most preferably from about 0.01:1 to about 1.4:1.

Excess X is the amount of halide above that amount which is theoretically required to convert the organomagnesium component to magnesium dihalide.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the catalytic reaction product as hereinbefore described. Especially advantageous is the copolymerization of ethylene and higher α-olefins using the catalytic reaction product of this invention. The foregoing polymerization process is most beneficially carried out under relatively low temperature (as compared to classical high pressure free radical techniques) and pressure, although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene, mixtures thereof and the like. It is understood that α-olefins may be copolymerized with other α-olefins and/or with small amounts, i.e. up to about 25 weight percent based on the polymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40, weight percent, of propylene, butene-1, hexene-1, octene-1, 4-methylpentene-1, 1,7-octadiene or similar α-olefin or diolefin based on total monomer.

Particularly suitable organometal compounds which can be employed herein include, for example, diethyl magnesium, dibutyl magnesium, triethyl aluminum, diethyl aluminum dichloride, ethyl aluminum dichloride, ethyl magnesium chloride, ethyl lithium, triethyl boron, mixtures thereof and the like.

Suitable transition metal compounds which can be employed in the present invention include those represented by the empirical formulae $Tm(OR)_y X_{x-y}$, $TmOX_{x-2}$ and $Tm(OR)_{x-2}O$, wherein Tm is a transition metal selected from groups IVB, VB or VIB; each R is independently a hydrocarbyl group, preferably alkyl or aryl, having from 1 to about 20, preferably from 1 to about 10, carbon atoms; each X is independently a halogen, preferably chlorine or bromine; x has a value equal to the valence of Tm and y has a value from 1 to the valence of Tm.

Particularly suitable transition metal compounds include, for example, tetraethoxy titanium, tetraisopropoxy titanium, tetra-n-butoxy titanium, di-n-butoxy titanium dichloride, tetraphenoxy titanium, tetra-n-propoxy titanium, tetra-(2-ethylhexoxy) titanium, tri-n-butyoxy vanadium oxide, oxyvanadium trichloride, tri-isopropoxy vanadium oxide, zirconium tetra-n-butoxide, zirconium tetra-n-propoxide, zirconium tetraisopropoxide, mixtures thereof and the like.

Suitable organomagnesium components which can be employed in the present invention as component (B-a) include those represented by the empirical formula $MgR''_2 \cdot xMR''_y$, wherein each R'' is independently hydrocarbyl or hydrocarbyloxy; M is aluminum, zinc or mixtures thereof; x is about zero to about 10, preferably 0.001 to about 5, most preferably from about 0.15 to about 2.5; and y denotes the number of hydrocarbyl and/or hydrocarbyloxy groups which corresponds to the valence of M. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms is preferred. Hydrocarbyl is preferred over hydrocarbyloxy.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides and metallic halides.

Suitable non-metallic halides are represented by the empirical formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e. as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides which can be employed herein include those represented by the empirical formula $M'R_{y-a}X_a$ wherein M' is a metal of Groups IIB, IIIA or IVA, of Mendeleev's Periodic Table of Elements, R is a monovalent organic radical, X is a halogen, y has a value corresponding to the valence of M' and a has a value from 1 to y. Preferred metallic halides are aluminum halides of the empirical formula $AlR_{3-a}X_a$ wherein each R is independently hydrocarbyl as hereinbefore defined such as alkyl, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g. R″, and the organic moieties of the halide source, e.g. R and R′, are suitably any other organic radical provided that they do not contain functional groups that poison conventional Ziegler catalysts. Preferably such organic moieties do not contain active hydrogen, i.e., those sufficiently active to react with the Zerewitinoff reagent.

In preparing the reaction product or complex of the present invention from said reducing compounds and said transition metal compounds, the two components are simply mixed together in a suitable solvent at any suitable temperature, usually from about $-50°$ C. to $100°$ C., preferably from about $0°$ C. to about $30°$ C., for a time sufficient to cause a color change in the reaction mixture. At lower temperatures longer times are typically required.

The reaction time is also affected by the concentration of the reactants, e.g. low concentrations require longer times at any given temperature than do higher concentrations. The solvents which can be employed include those suitable for preparing the catalysts of this invention with the hydrocarbon solvents being most suitable.

The color change varies depending upon the particular components employed.

The magnesium halide can be preformed from the organomagnesium compound and the halide source or it can be prepared in situ in which instance the catalyst is prepared by mixing in a suitable solvent (1) the organomagnesium component; (2) the halide source and (3) the reaction product or complex formed by mixing (a) said transition metal compound and (b) said zinc compound.

The foregoing catalyst components are combined in proportions sufficient to provide atomic ratios as previously mentioned.

In cases wherein neither the organomagnesium component (B-a) nor the halide source contains aluminum or contains an insufficient quantity of aluminum, it is necessary to include in the total catalyst an aluminum component such as alkyl aluminum compound, e.g. a trialkyl aluminum, an alkyl aluminum halide or an aluminum halide. If polymerization temperatures below $180°$ C. are employed, the atomic ratios of Al:Ti may be from about 0.1:1 to about 200:1, preferably from 0.5:1 to about 100:1, However, when polymerization temperatures above $180°$ C. are employed, the aluminum compound is used in proportions such that the Mg:Al ratio is more than 0.3:1, preferably from 0.5:1 to 10:1, and Al:Ti ratio is less than 120:1, preferably less than 75:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide. In the above mentioned aluminum compounds, the alkyl groups independently have from 1 to about 20, preferably from 1 to about 10 carbon atoms.

When additional quantities of aluminum compound are employed, it can be added to the aforementioned catalyst during the preparation thereof or the aluminum deficient catalyst can be mixed with the appropriate aluminum compound prior to entry into the polymerization reactor or, alternatively, the aluminum deficient catalyst and the aluminum compound can be added to the polymerization reactor as separate streams or additions.

The foregoing catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about $-50°$ to about $200°$ C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about $-100°$ to about $200°$ C., preferably from about $0°$ to about $100°$ C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In order to maximize catalyst efficiency, the catalyst is prepared by mixing the components of the catalyst in an inert liquid diluent in the following especially preferred order: organomagnesium compound, halide source, the aluminum compound if required, and the reaction product or complex transition metal compound and organometal compound represented by the formula $MR_xX_y$.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about $0°$ to about $300°$ C., preferably at solution polymerization temperatures, e.g. from about $130°$ to about $250°$ C., for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally, in the polymerization process, a carrier which may be an inert organic diluent or solvent or excess monomer is employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g. from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures througout the polymerization zone.

In order to optimize catalyst yields in the polymerization of ethylene, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively narrow molecular weight distribution.

The following examples are given to illustrate the invention, and should not be construed as limiting its scope. All percentages are by weight and all parts are by molar or atomic ratio unless otherwise indicated.

EXAMPLES 1-7 AND COMPARATIVE EXPERIMENTS A-B

A. Preparation of the transition metal complexes or reaction products with the $MR_xX_y$ compounds A stock solution (0.5 M) of titanium tetra-isopropoxide ($Ti(OiPr)_4$) was prepared by mixing 14.88 ml of neat solution (3.36 M) with sufficient ISOPAR® E (an isoparaffinic hydrocarbon fraction having a boiling range of 116°-134° C.) to bring the total volume to 100 ml. After the solution was well mixed, 1.0 ml of the solution was transferred to a small vial where it was mixed with various quantities of $Mr_xX_y$ compound. These solutions developed characteristic colors as indicated in Table I. The molar quantity of $MR_xX_y$ compound per mole of $Ti(OiPr)_4$ is given in Table I. The solutions were stored in amber bottles to prevent photodecomposition of the complex.

TABLE I

| Characteristic Colors of $MR_xX_y$-Titanium Complexes or Reaction Products | | |
|---|---|---|
| $MR_xX_y$ Compound | Ratio of $Q^1$:Ti | Color |
| DBM[2] | 0.5 | Green solution which turned purple after ~ three days |
| " | 1.0 | Same |
| " | 2.0 | Dark brown solution |
| BuLi[3] | 0.5 | Green solution which turned blue after ~ two days |
| " | 1.0 | Brown solution |
| AlEt$_3$[4] | 0.17 | Light purple solution |
| " | 0.33 | Purple solution |

[1]Q = the value of x ÷ valence of M in the formula $MR_xX_y$ times the number of moles of $MR_xX_y$
[2]DBM = n-butyl, sec-butyl magnesium
[3]BuLi = sec-butyl lithium
[4]AlEt$_3$ = triethyl aluminum

B. Preparation of the Catalyst Composition (Ex. 1-3 and C.E. A

The catalyst compositions were prepared by adding with stirring under a nitrogen atmosphere to a 4-ounce (118.28 cc) serum bottle the following components in the following order:

| | |
|---|---|
| 97.60 | ml of ISOPAR® E |
| 0.80 | ml of 0.94 M ethyl aluminum dichloride |
| 0.60 | ml of 0.025 M $Ti(OiPr)_4$ or ($Ti(OiPr)_4$ + $MR_xX_y$) |
| 1.00 | ml of 0.60 M n-butyl, sec-butyl magnesium (DBM) |

-continued

| 100.0 | ml |

The temperature of the serum bottles was maintained at ambient temperature (about 22° C.).

C. Preparation of Catalyst Composition (Ex. 4-7 and C.E. B)

The catalyst was prepared as in B above employing the following components added in the order listed.

| 97.80 | ml of ISOPAR ® E |
| 0.85 | ml of 0.703 M DBM |
| 0.75 | ml of 1.0 M ethyl aluminum dichloride |
| 0.60 | ml of 0.025 M Ti(OiPr)$_4$ or (Ti(OiPr)$_4$ + MR$_x$X$_y$) |
| 100.0 | ml |

D. Polymerization

A stirred batch reactor containing 2 liters of ISOPAR ® E was heated to 150° C. The solvent vapor pressure was 21 psig. To this was added 6 psig of hydrogen and 173 psig of ethylene for a total reactor pressure of 200 psig. An amount of the above catalyst was injected into the reactor (10 ml=0.0015 mMoles Ti), and the reactor pressure was maintained constant at 200 psig with ethylene. The total reaction time was 20 minutes. The titanium species used and catalyst efficiencies are given in Table II.

It is evident from Table II that small amounts of highly reducing organometal compounds can cause unexpected increases in catalyst efficiency. Each example showed increases in initial exotherm and/or catalyst efficiency. It is importnat, however, that the value of Q be within the prescribed range in order to maximize this enhancement.

TABLE II
POLYMERIZATION RESULTS

| Example or Comp. Expt. No. | Titanium Species | Value of Q | Initial Exotherm °C. | Efficiency #PE/#Ti |
|---|---|---|---|---|
| A | Ti(OiPr)$_4$[2] | N.A.[1] | 15 | 2.00 × 10$^6$ |
| 1 | Ti(OiPr)$_4$ + 0.25 DBM[3] | 0.25 | 15 | 2.45 × 10$^6$ |
| 2 | Ti(OiPr)$_4$ + 0.5 DBM | 0.5 | 20 | 3.77 × 10$^6$ |
| 3 | Ti(OiPr)$_4$ + 1 DBM | 1 | 11 | 2.33 × 10$^6$ |
| B | Ti(OiPr)$_4$ | N.A. | 17 | 1.97 × 10$^6$ |
| 4 | Ti(OiPr)$_4$ + 0.5 TEA[5] | 0.5 | 18 | 2.21 × 10$^6$ |
| 5 | Ti(OiPr)$_4$ + 1 TEA | 1.0 | 20 | 2.09 × 10$^6$ |
| 6 | Ti(OiPr)$_4$ + 1 EADC[6] | 0.33 | 17 | 2.12 × 10$^6$ |
| 7 | Ti(OiPr)$_4$ + 2 EADC | 0.66 | 23 | 2.07 × 10$^6$ |

[1]N.A. = Not applicable
[2]Ti(OiPr)$_4$ = Tetraisopropoxy titanium
[3]DBM = n-butyl, sec-butyl magnesium
[4]DEZ = diethyl zinc
[5]TEA = triethyl aluminum
[6]EADC = ethyl aluminum dichloride

We claim:

1. A hydrocarbon soluble reaction product or complex formed from the admixture at a temperature and time sufficient to provide a color change of
   (a) at least one transition metal compound represented by the empirical formulae Tm(OR)$_y$X$_{x-y}$ or Tm(OR)$_{x-2}$O wherein Tm is a transition metal selected from groups IVB, VB or VIB; each R is independently a hydrocarbyl group, having from 1 to about 20 carbon atoms; each X is independently a halogen; x has a value equal to the valence of Tm and y has a value from 1 to the valence of Tm; and
   (b) at least one organometal compound represented by the empirical formula MR$_x$X$_y$; wherein M is a metal selected from magnesium, aluminum, boron, lithium or mixtures thereof; R is an alkyl group having from 1 to about 20 carbon atoms; X is a halogen, x has a value of from 1 to the valence of metal M; the value of x+y is equal to the valence of M; the quantities of (a) and (b) employed being that which provides a ratio of Q:Tm of from about 0.1:1 to about 2:1; and wherein Q has a value corresponding to the value of x divided by the valence of M times the number of moles of MR$_x$X$_y$.

2. A reaction product or complex of claim 1 wherein in component (a) Tm is titanium, each R is independently a hydrocarbyl group having from 2 to about 10 carbon atoms and X is chlorine or bromine; and in component (b) R is an alkyl group having from 1 to about 10 carbon atoms; and the Q:Ti ratio is from about 0.2:1 to about 1.5:1.

3. A reaction product or complex of claim 2 wherein in component (a) R is a saturated aliphatic hydrocarbyl group and the Q:Ti ratio is from about 0.5:1 to about 1:1.

4. A reaction product or complex of claims 1, 2, or 3 wherein component (a) is titanium tetraethoxide, titanium tetra-n-propoxide, titanium tetraisopropoxide, titanium tetra-n-butoxide or titanium tetra-(2-ethylhexoxide) or mixture thereof and component (b) is n-butyl, sec-butyl magnesium, triethyl aluminum, sec-butyl lithium, ethyl aluminum dichloride or mixture thereof.

5. A catalytic reaction product of
(A) a hydrocarbon soluble reaction product or complex formed from the admixture at a temperature and time sufficient to provide a color change of
   (1) at least one transition metal compound represented by the formulae Tm(OR)$_y$X$_{x-y}$ or Tm(OR)$_{x-2}$O wherein Tm is a transition metal selected from groups IVB, VB or VIB; each R is independently a hydrocarbyl group, having from 1 to about 20 carbon atoms; each X is independently a halogen; x has a value equal to the valence of Tm and y has a value from 1 to the valence of Tm; and
   (2) at least one compound represented by the empirical formula MR$_x$X$_y$; wherein M is a metal selected from magnesium, aluminum, boron, lithium or mixtures thereof; R is an alkyl group having from 1 to about 20 carbon atoms; X is a halogen, x has a value of from 1 to the valence of metal M; the value of x+y is equal to the valence of M; the quantities of (a) and (b) employed being that which provides a ratio of Q:Tm of from about 0.1:1 to about 2:1 and wherein Q has a value corresponding to the value of x divided by the valence of M times the number of moles of MR$_x$X$_y$;
(B) a magnesium halide resulting from the reaction of
   (1) an organomagnesium compound represented by the empirical formula MgR'$_2$.xM'R''$_y$ wherein M' is aluminum or zinc, each R'' is independently a hydrocarbyl or hydrocarbyloxy group having from 1 to about 20 carbon atoms, x has a value from zero to 10 and y has a value corresponding to the valence of M'; with
   (2) a halide source selected from
      (a) an active non-metallic halide, said non-metallic halide corresponding to the formula R'X wherein R' is hydrogen or a hydrocarbyl group such that the hydrocarbyl halide is at least as active as sec-butyl chloride and does not poison the catalyst and X is halogen or (b) a metallic halide corresponding to the enpirical formula $M''R_{y-a}X_a$ wherein $M''$ is a metal of Group IIV, IIIA or IVA of Mendeleev's Periodic Table of Elements, R is a monovalent hydrocarbyl radical, X is halogen, y is a number corresponding to the valence of $M''$ and a is a number of 1 to y; and (C) when the organomagnesium component and/or the halide source provides insufficient quantities of aluminum, an aluminum compound represented by the empirical formula $AlR_{y'}X_{y''}$ wherein R and X are as defined above and y' and y" each have a value of from zero to three with the sum of y' and y" being three; and wherein the components are employed in quantities which provide an atomic ratio of the elements Mg:Tm of from about 1:1 to about 200:1; Al:Tm of from about 0.1:1 to about 200:1 and an excess X:Al of from about 0.0005:1 to about 5:1.

6. A catalytic reaction product of claim 5 wherein (i) in component (A-1), Tm is titanium, each R is independently a hydrocarbyl group having from 1 to about 10 carbon atoms and X is chlorine or bromine;

(ii) in component (A-2), R is an alkyl group having from 1 to about 10 carbon atoms;

(iii) in component (B-1), M' is aluminum and R" is a hydrocarbyl group having from 1 to about 10 carbon atoms and x has a value of from about 0.001 to about 5;

(iv) in component (B-2-a), R' is hydrogen or a tertiary butyl group and X is chlorine;

(v) in component (B-2-b), M" is a metal from Groups IIIA or IVA, y-a is zero or 1 and X is chlorine;

(vi) in component (C), the aluminum compound is a trialkyl aluminum compound wherein the alkyl groups independently have from 1 to about 10 carbon atoms; and (vii) the components are employed in quantities so as to provide atomic ratios of Mg:Ti of from about 2:1 to about 100:1; Q:Ti from about 0.2:1 to about 1.5:1; Al:Ti of from about 0.5:1 to about 100:1 and excess X:Al of from about 0.002:1 to about 2:1.

7. A catalytic reaction product of claim 6 wherein (i) in component (A-1), R is a saturated aliphatic hydrocarbyl group;

(ii) in component (B-1), x has a value of from about 0.15 to about 2.5; and (iii) the components are employed in quantities so as to provide atomic ratios of Mg:Ti of from about 5:1 to about 75:1; Q:Ti from about 0.5:1 to about 1:1 and excess X:Al of from about 0.01:1 to about 1.4:1.

8. A catalytic reaction product of claim 7 wherein (i) component (A-1) is titanium tetraethoxide, titanium tetra-n-propoxide, titanium tetraisopropoxide, titanium tetra-n-butoxide, or titanium tetra-(2-ethylhexoxide);

(ii) component (A-2) is is n-butyl, sec-butyl magnesium, triethyl aluminum, sec-butyl lithium, ethyl aluminum dichloride or mixture thereof;

(iii) component (B-1) is a dialkyl magnesium compound wherein the alkyl groups independently have from 1 to about 10 carbon atoms; and (iv) component (B-2) is substantially anhydrous hydrogen chloride, ethyl aluminum dichloride or tin tetrachloride.

9. A catalyst reaction product of claims 5, 6, 7 or 8 wherein the components are added in the order (B-1), (B-2), (C) if employed and (A).

10. A catalytic reaction product of claims 5, 6, 7 or 8 wherein the components are added in the order (B-1), (B-2), (A) and (C) if employed, and provided that the halide source, (B-2), is not a tin compound.

* * * * *

United States Patent and Trademark Office

CERTIFICATE OF CORRECTION

PATENT NO. : 4,409,126
DATED : October 11, 1983
INVENTOR(S) : Randall S. Shipley, Donald F. Birkelbach It is certified that error appears in the above—identified patent and that said Letters Patent is hereby corrected as shown below:

Col. 1, line 44, "but" should read -- by --.

Col. 5, line 47, "component" should be -- compound --.

Col. 5, line 47, "as alkyl" should read -- as an alkyl --.

Col. 7, line 28, "througout" should read -- throughout --.

Col. 8, line 33, "$Mr_xX_y$" should read -- $MR_xX_y$ --.

Col. 9, line 36, "importnat" should read -- important --.

Col. 10, line 60, "$MgR'_2 \cdot xM'R''_y$" should read -- $MgR''_2 \cdot xM'R''_y$ --.

Col. 11, line 5, "enpiri-" should read -- empiri- --.

Col. 12, line 24, the second occurrence of "is" should be deleted.

Col. 12, line 33, "catalyst" should be -- catalytic --.

Signed and Sealed this

Twentieth Day of March 1984

[SEAL]

Attest:

GERALD J. MOSSINGHOFF

Attesting Officer  Commissioner of Patents and Trademarks